United States Patent [19]

King

[11] 4,236,990

[45] Dec. 2, 1980

[54] TREATER WITH SELF-CLEANING ELECTRODES

[76] Inventor: Arthur S. King, 8021 Cherokee La., Leawood, Kans. 66206

[21] Appl. No.: 42,775

[22] Filed: May 29, 1979

[51] Int. Cl.³ .......................... C25B 9/00; C02F 1/46; C25B 11/02
[52] U.S. Cl. .................................. 204/275; 204/149; 204/286
[58] Field of Search .............................. 204/275–277, 204/149, 272, 286

[56] References Cited

U.S. PATENT DOCUMENTS

| | | | |
|---|---|---|---|
| 2,399,289 | 4/1946 | Negus | 204/275 |
| 3,785,954 | 1/1974 | Herbert | 204/275 X |
| 3,793,178 | 2/1975 | Austin et al. | 204/275 X |
| 3,893,902 | 7/1975 | Loftfield et al. | 204/275 X |
| 3,915,817 | 10/1975 | Bennett | 204/275 X |

*Primary Examiner*—John H. Mack
*Assistant Examiner*—D. R. Valentine

*Attorney, Agent, or Firm*—Schmidt, Johnson, Hovey & Williams

[57] ABSTRACT

The treater employs a pair of closely spaced, superimposed circular electrode plates, and the liquid to be treated is passed through the limited area between such plates in a pressurized sheet such that the liquid tends to clean the electrodes at the same time as it receives treatment thereby. An annular groove adjacent the discharge periphery of the lower plate has the effect of causing the discharging sheet to assume an umbrella-like configuration to promote aeration of the discharging liquid. If desired, the plates may be associated with a receptacle in such a way that the umbrella-like discharging sheet engages the walls of the receptacle at one electrical polarity while at least one of the electrode plates is of the opposite electrical polarity so as to promote effective treatment. On the other hand, if desired, the plates may be submerged within such a receptacle adjacent the sludge collecting at the bottom thereof. In one embodiment the opposed plates are of the same electrical polarity while another electrode situated upstream from the plates is oppositely charged.

7 Claims, 4 Drawing Figures

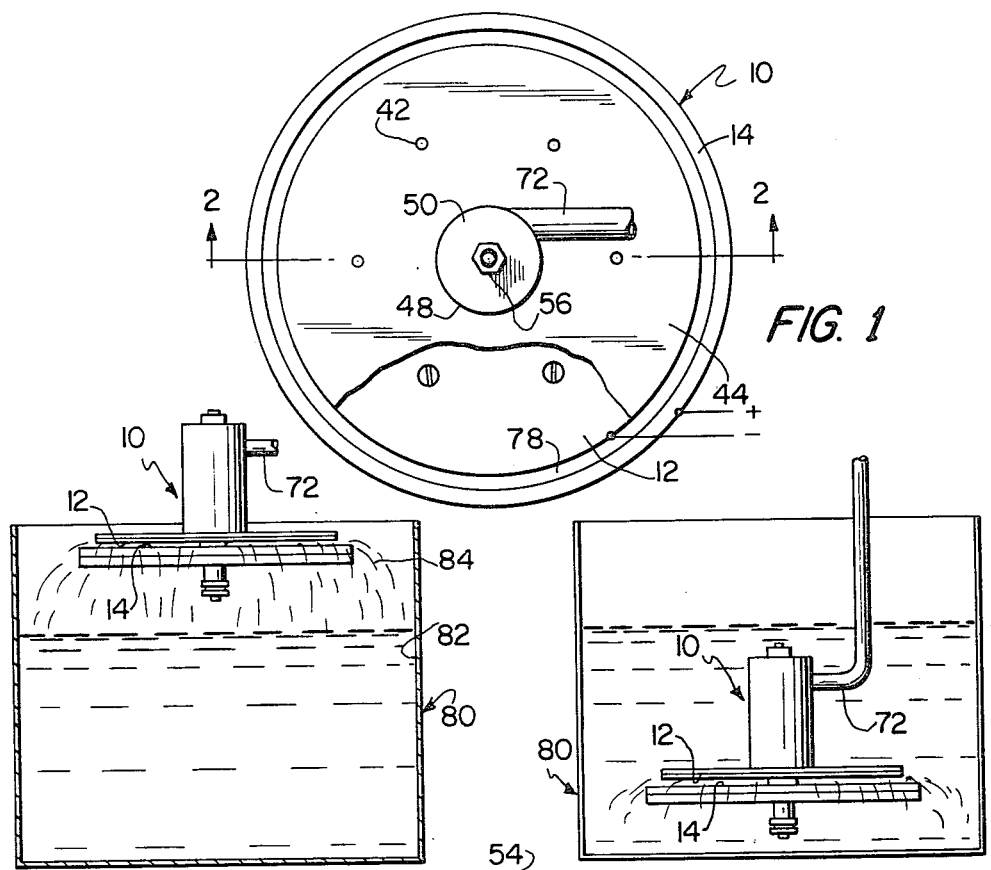
FIG. 1
FIG. 3
FIG. 4
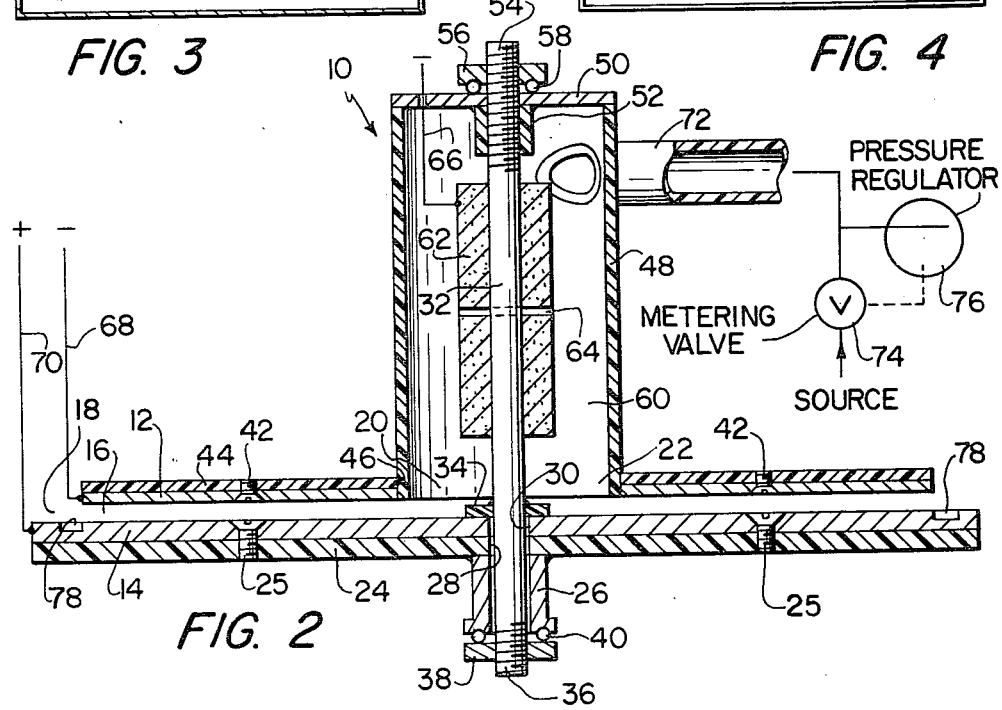
FIG. 2

4,236,990

TREATER WITH SELF-CLEANING ELECTRODES

TECHNICAL FIELD

This invention relates to the field of treating liquids such as waste water containing suspended particulate matter with electrical means so as to increase the tendency of such particles to agglomoerate and thereupon settle out of the liquid subsequent to passing through the treater.

BACKGROUND ART

Treaters wherein oppositely charged electrodes are utilized have a tendency to develop a layer of particulate matter on their surfaces exposed to the liquid being treated, this reducing the effectiveness of such electrodes insofar as inducing the particles suspended within the liquid to agglomerate and settle out is concerned. Furthermore, there is a tendency for the dipole water molecules to be attracted into close proximity with one of the electrodes during operation, thereby effectively building a barrier or layer of water molecules around the electrode that inhibits migration of the impurity particles toward the electrode surface into physical contact with the latter. Such physical contact, it has been previously discovered, is important insofar as inducing the particles to thereupon attract one another and agglomerate.

Prior devices have relied upon various techniques for cleaning the electrodes either simultaneously with or periodically following treatments, but most have been less than satisfactory for a variety of reasons.

SUMMARY OF THE PRESENT INVENTION

Accordingly, it is an important object of the present invention to provide a self-cleaning electrode system that avoids the drawbacks of prior self-cleaning arrangements.

Pursuant to the foregoing object, the present invention includes the use of a pair of closely spaced, facing plates that are held against rotation during operation, the close spacing between such plates serving to define a flat passage area for liquid to move during treatment. The electrode plates receive the liquid under sufficient pressure to keep the flat passage area completely filled with liquid during treatment such that the liquid is forced into a thin sheet as it moves between the plates and discharges from the same at their peripheral edges. Consequently, the pressurized sheet not only receives the electric action imparted by the plates, but also scours and cleans the same to remove undesirable residue and to avoid stabilized formation of the inhibiting boundary layer of dipole water molecules along the electrode plate surfaces.

BRIEF DESCRIPTION OF THE DRAWING

FIG. 1 is a top plan view of a treater constructed in accordance with the principles of the present invention, a portion of the same being broken away to reveal details of construction;

FIG. 2 is an enlarged, vertical cross-sectional view through the treater taken substantially along line 2—2 of FIG. 1;

FIG. 3 is a schematic view of the treater on a reduced scale showing one manner of use thereof wherein the treater is situated within a receptacle but above the liquid level thereof with the umbrella-like sheet issuing from the treater in contacting engagement with the walls of the receptacle; and FIG. 4 is a schematic illustration of the treater in another manner of use thereof wherein the treater is submerged below the level of liquid within a receptacle for concentrated use in the lower regions of the body of liquid.

DETAILED DESCRIPTION

The treating device 10 broadly includes a pair of superimposed, closely spaced apart electrode plates 12 and 14 of circular configuration when viewed in plan as in FIG. 1. The restricted space between the plates 12 and 14 assumes a generally flat configuration and functions as a flow passage 16 for liquid to be treated, the passage 16 having an outlet 18 located at the peripheral edges of the plates 12 and 14 and an inlet 20 defined in part by an opening 22 disposed centrally within the upper plate 12.

The bottom plate 14 is fabricated from a suitable metal material and is attached to a supporting disc 24 of dielectric material. The disc 24 has the same overall dimensions as the plate 14 and is in direct underlying relationship to the latter, being affixed to the plate 14 by suitable fasteners such as the screws 25. The disc 24 is in turn affixed such as by a suitable cement to a collar 26 that depends downwardly from the disc 24 along the central axis thereof in registration with a hole 28 in the disc 24 and an aligned hole 30 in the plate 14. The resulting assembly of the plate 14, the disc 24 and the collar 26 is slipped onto a central shank 32 until the plate 14 abuts a limit stop 34 fixed to the shank 32. The lowermost threaded end 36 of the shank 32 threadably receives a nut 38 which clamps the assembly 14, 24, 26 up against the limit stop 34, there being an O-ring 40 compressed between the collar 26 and the nut 38 so as to prevent unintended escape of liquid through the interface between collar 26 and nut 38.

The upper plate 12 is likewise fabricated from a suitable conductive metal material and is attached by suitable fasteners such as the screws 42 to a superimposed mounting disc 44 of dielectric material, such disc 44 having the same overall dimensions as the plate 12. The disc 44 is provided with its own opening 46 disposed in coaxial registration with the opening 22 of plate 12, and such aligned openings 22 and 46 receive a tubular, upright housing 48 bonded adjacent its lower end to the disc 44 such that the housing 48, the disc 44 and the plate 12 effectively become integrated into a single assembly.

The housing 48 is of cylindrical configuration and is provided with a cap 50 across its upper end which is centrally perforated so as to receive the shank 32, thereby placing the housing 48 in coaxial relationship to the plates 12 and 14 centrally thereof. A collar 52 internally of the housing 48 depends from and is affixed to the cap 50, such collar 52 being internally threaded so as to permit the assembly consisting of the housing 48, the disc 44 and the plate 12 to be threaded down onto the upper threaded end 54 of the shank 32. The extent to which such assembly is threaded onto the shank 32 determines the width of the passage 16, and a jam nut 56 threaded onto the upper end 54 of shank 32 is clamped down against the cap 50 to hold the assembly 48, 44, 12 in a selected vertical position along the shank 32. A sealing O-ring 58 may be clamped between the jam nut 56 and the cap 50.

The housing 48 effectively defines part of the means defining an inlet to the restricted passage 16, and within the internal chamber 60 of the housing 48, an electrode 62 may be located in accordance with one aspect of the present invention. Such electrode 62 may be fabricated from carbonaceous material and, for convenience, may be supported within the chamber 60 by a pin 64 that attaches the electrode 62 to the shank 32. As illustrated, the electrode 62 may be electrically connected to the negative side of a source of electrical potential by a suitable lead 66.

On the other hand, the plates 12 and 14, depending upon whether or not the electrode 62 is utilized and its selected polarity, may be either both of the same polarity (opposite to that of the electrode 62), or of a mutually opposite polarity. As illustrated, the two plates 12 and 14 are connected by leads 68 and 70 respectively to the positive side of a source of electrical potential such as to be oppositely charged from the electrode 62, but in the event that the electrode 62 is not utilized, the plates 12 and 14 will be oppositely charged and thus will be connected to opposite sides of the source of electrical potential.

Adjacent the upper end of the housing 48 is a tangentially disposed supply line 72 for introducing liquid into the chamber 60 of the housing 48. The line 72 is in turn controled by a metering valve 74 that is governed by a pressure regulator 76 responsive to pressure in the line 72 downstream from the valve 74 such that liquid is always supplied to the passage 16 between plates 12 and 14 at such a pressure as to keep the passage 16 filled with a sheet of liquid.

The upper plate 12 and its associated disc 44 is of smaller diameter than the lower plate 14 and its associated disc 24 such that the periphery of plate 12 is set back with respect to the periphery of the plate 14. An annular, marginally disposed groove 78 in the lower plate 14 is disposed slightly outboard of the peripheral edge of plate 12 but slightly inboard of the peripheral edge of the plate 14 for imparting an umbrella-like configuration to the liquid sheet issuing from the discharge outlet 18.

The basic operation of the device 10 should be apparent from the foregoing description. As liquid is introduced into the device via the supply line 72, it passes through the centrally disposed inlet 20 and emanates outwardly therefrom in radial directions through the passage 16 between electrode plates 12 and 14. In view of the closely spaced nature of the plates 12 and 14, the liquid is reduced to a sheet-like configuration which entirely fills the passage 16, such sheet-like configuration not only improving the electric action imparted by the plates 12 and 14 on the liquid, but also having the benefit of applying a pressurized scouring or scrubbing action against the surfaces of the plates 12 and 14. As earlier mentioned, such action not only helps rid the plates 12 and 14 of extraneous residue that would inhibit proper electrical action, but also reduces the tendency of the dipole water molecules in the liquid from stabilizing immediately adjacent the surfaces of the plates 12 and 14 such as to inhibit migration of impurity particles toward such surfaces. Consequently, overall electrical action is improved, to the end that particles in the solution issuing from the device 10 have a greater tendency to agglomerate and subsequently settle out than would otherwise be true.

As above mentioned, if desired, the electrode 62 need not be utilized, in which event the plates 12 and 14 would be desirably oppositely charged. However, an additional arrangement keeps the plates 12 and 14 of one charge while charging a receptacle 80 such as that shown in FIG. 3 oppositely from that of the plates 12 and 14, the walls 82 of the receptacle 80 being so disposed with respect to the treater 10 that the liquid sheet 84 issuing from the treater 10 physically engages the walls 82 such as to establish electrical continuity between the plates 12, 14 and the walls 82. It is also noteworthy that in utilizing the arrangement of FIG. 3, even if the walls 82 of the receptacle 80 are not electrified, the groove 78 in bottom plate 14 causes the liquid sheet issuing from the discharge outlet 18 to form an umbrella-like configuration, thereby promoting aeration which also assists in treatment of the liquid.

If so desired, the device 10 may be submerged within the body of liquid within the receptacle 80 as illustrated in FIG. 4, this being particularly advantageous when it is desired to co-mingle sludge at the bottom of the receptacle 80 with liquid that has received electrification immediately before coming into the vicinity of the sludge.

I claim:

1. A device for electrically treating a liquid comprising:
   a pair of electrode plates;
   means mounting said plates in closely spaced, facing relationship to one another so as to define a relatively flat, restricted passage for liquid between the plates,
   said passage having a discharge outlet at the periphery of said plates;
   means defining an inlet to said passage inboard of said periphery of the plates and through which liquid may be introduced to the passage; and
   means for supplying liquid to said inlet at a pressure that will maintain said passage filled with a pressurized liquid sheet flowing toward and exiting from said outlet, whereby the sheet cleans said plates while being treated thereby,
   one of said plates having its periphery set inwardly with respect to that of the other plate,
   said other plate having a continuous marginal groove located inboard of its periphery but outboard of the periphery of said one plate for causing said liquid sheet to assume an umbrella-like configuration as it is discharged from said outlet.

2. A device as claimed in claim 1, wherein said plates are circular in plan and are disposed in coaxial relationship to each other, said inlet including an opening in the center of one of said plates.

3. A device as claimed in claim 1, wherein said plates are circular and said groove is annular.

4. A device as claimed in claim 1, wherein said inlet defining means includes an opening in a certain of said plates and a tubular housing in a flow communication with said opening upstream from the latter, said housing having an electrode associated therewith connected across a source of electrical potential in such a way as to be charged oppositely from at least one of said plates.

5. A device as claimed in claim 4, wherein said plates are circular and coaxially disposed, said opening, said housing and said electrode being located on the common central axis of the plates.

6. A device for electrically treating a liquid comprising:
   a pair of electrode plates;

means mounting said plates in closely spaced, facing relationship to one another so as to define a relatively flat, restricted passage for liquid between the plates, said passage having a discharge outlet at the periphery of said plates;

means defining an inlet to said passage inboard of said periphery of the plates and through which liquid may be introduced to the passage; and means for supplying liquid to said inlet at a pressure that will maintain said passage filled with a pressurized liquid sheet flowing toward and exiting from said outlet, whereby the sheet cleans said plates while being treated therby, said plates being circular and provided with means adjacent said outlet for causing the sheet to issue in an umbrella-like configuration from the outlet, the plates being received within a container and being so positioned that the umbrella-shaped sheet engages the walls of the container, said walls of the container having one polarity and at least one of said plates having the opposite polarity.

7. A device as claimed in claim 1, wherein said plates are adapted to be submerged within a body of the treated liquid.

* * * * *